United States Patent
Labyre

(10) Patent No.: US 11,625,347 B2
(45) Date of Patent: Apr. 11, 2023

(54) METHOD OF STORING INSTRUCTIONS IN PROGRAM MEMORY AND ASSOCIATED SYSTEM

(71) Applicant: STMicroelectronics (Grenoble 2) SAS, Grenoble (FR)

(72) Inventor: Jean-Louis Labyre, Sassenage (FR)

(73) Assignee: STMicroelectronics (Grenoble 2) SAS, Grenoble (FR)

(*) Notice: Subject to any disclaimer, the term of this patent is extended or adjusted under 35 U.S.C. 154(b) by 0 days.

(21) Appl. No.: 17/464,062

(22) Filed: Sep. 1, 2021

(65) Prior Publication Data
US 2022/0066964 A1    Mar. 3, 2022

(30) Foreign Application Priority Data
Sep. 3, 2020 (FR) ..................... 2008956

(51) Int. Cl.
G06F 13/16 (2006.01)
G06F 9/44 (2018.01)
G06F 13/42 (2006.01)
G06F 9/4401 (2018.01)

(52) U.S. Cl.
CPC ........ *G06F 13/1689* (2013.01); *G06F 9/4406* (2013.01); *G06F 9/4411* (2013.01); *G06F 13/4282* (2013.01)

(58) Field of Classification Search
CPC .. G06F 13/1689; G06F 9/4406; G06F 9/4411; G06F 13/4282
See application file for complete search history.

(56) References Cited

U.S. PATENT DOCUMENTS

| | | | |
|---|---|---|---|
| 2012/0231734 A1* | 9/2012 | Symons | H04B 5/0075 455/41.1 |
| 2015/0126108 A1* | 5/2015 | Ashley | H04W 4/50 455/41.1 |
| 2016/0026832 A1* | 1/2016 | Wadman | G06K 17/0029 340/10.1 |
| 2016/0064781 A1* | 3/2016 | Specht | H01M 50/20 429/90 |
| 2016/0094545 A1* | 3/2016 | Dixit | H04B 5/0056 726/7 |
| 2016/0204832 A1* | 7/2016 | Holz | H01Q 9/40 455/41.1 |
| 2017/0286084 A1 | 10/2017 | Debates et al. | |
| 2018/0260209 A1* | 9/2018 | Dooley | H04B 5/0031 |

* cited by examiner

*Primary Examiner* — Henry Tsai
*Assistant Examiner* — Harry Z Wang
(74) *Attorney, Agent, or Firm* — Slater Matsil, LLP

(57) ABSTRACT

In an embodiment, a system includes a contactless reader and an apparatus. The apparatus includes a contactless transponder including a contactless interface and a transponder wired interface and being configured to communicate with a contactless reader according to a contactless protocol through the contactless interface. The apparatus includes a bus coupled to the transponder wired interface, and at least one module coupled to the bus, the at least one module including a processing circuit, the contactless reader being configured to communicate instructions of a software program executable by the processing circuit to the at least one module through the contactless transponder.

30 Claims, 18 Drawing Sheets

[Fig 1]
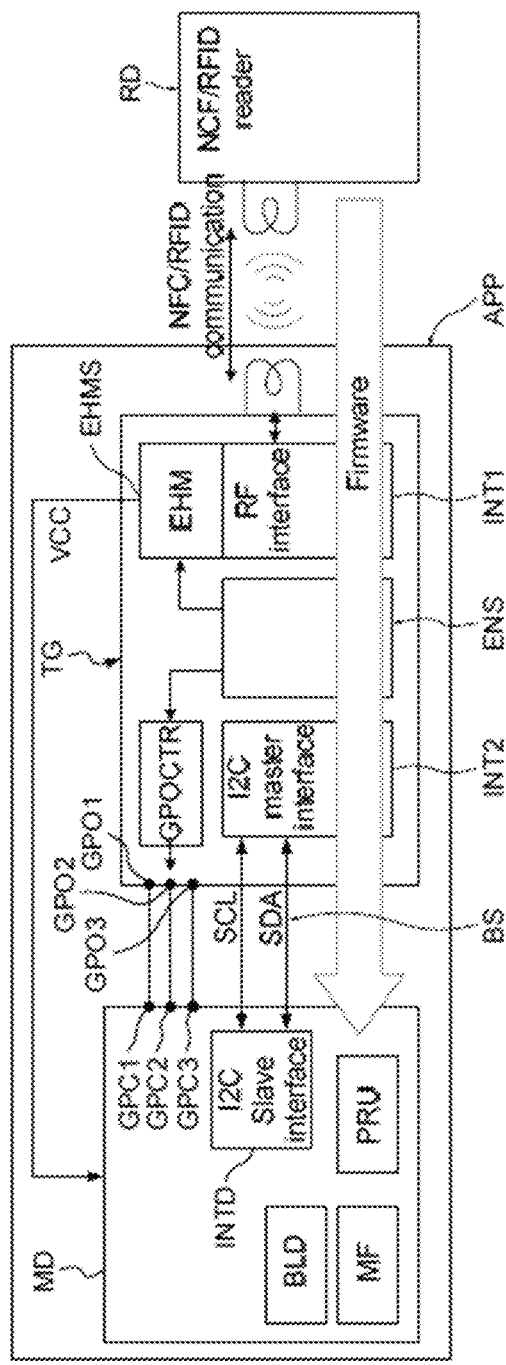

[Fig 2]
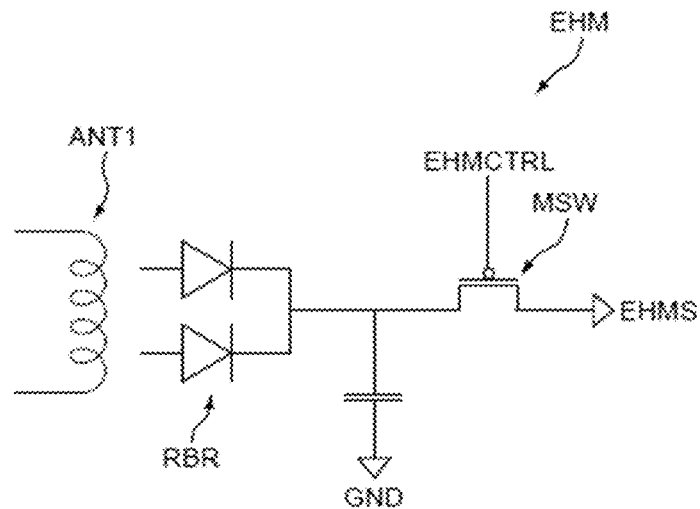
[Fig 3]
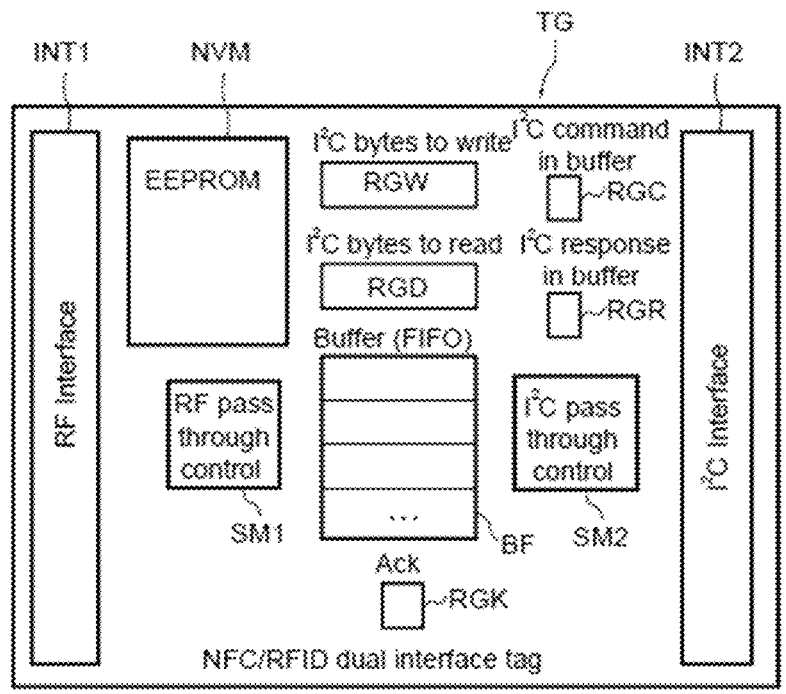

[Fig 4]
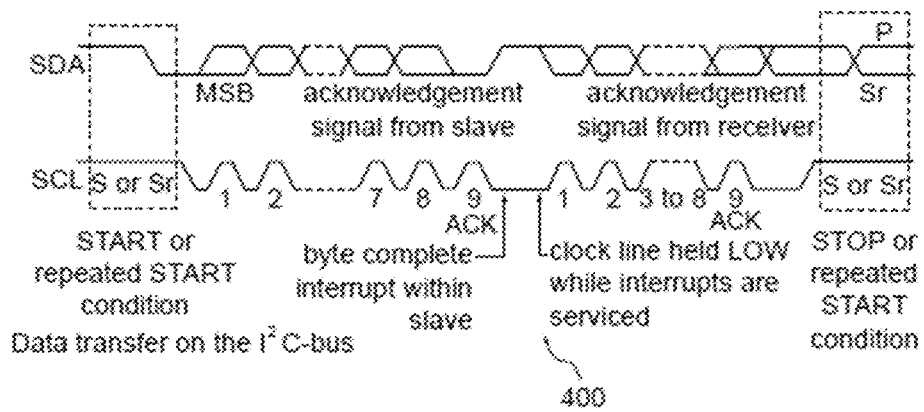
[Fig 5]
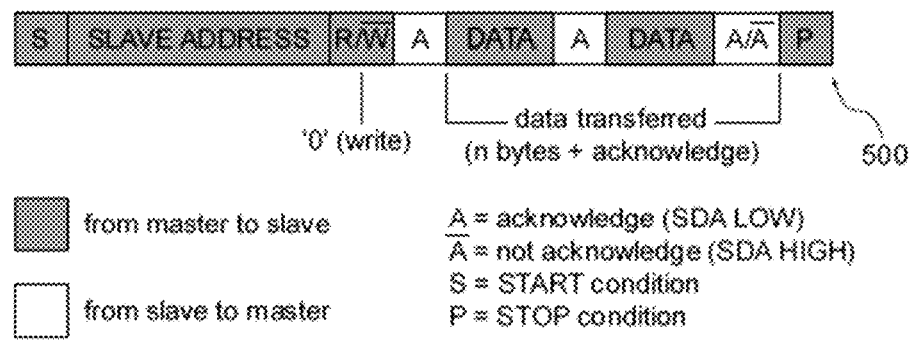
[Fig 6]
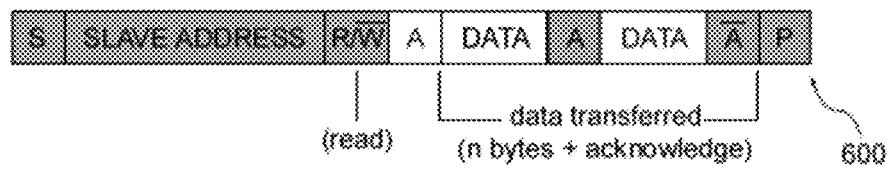

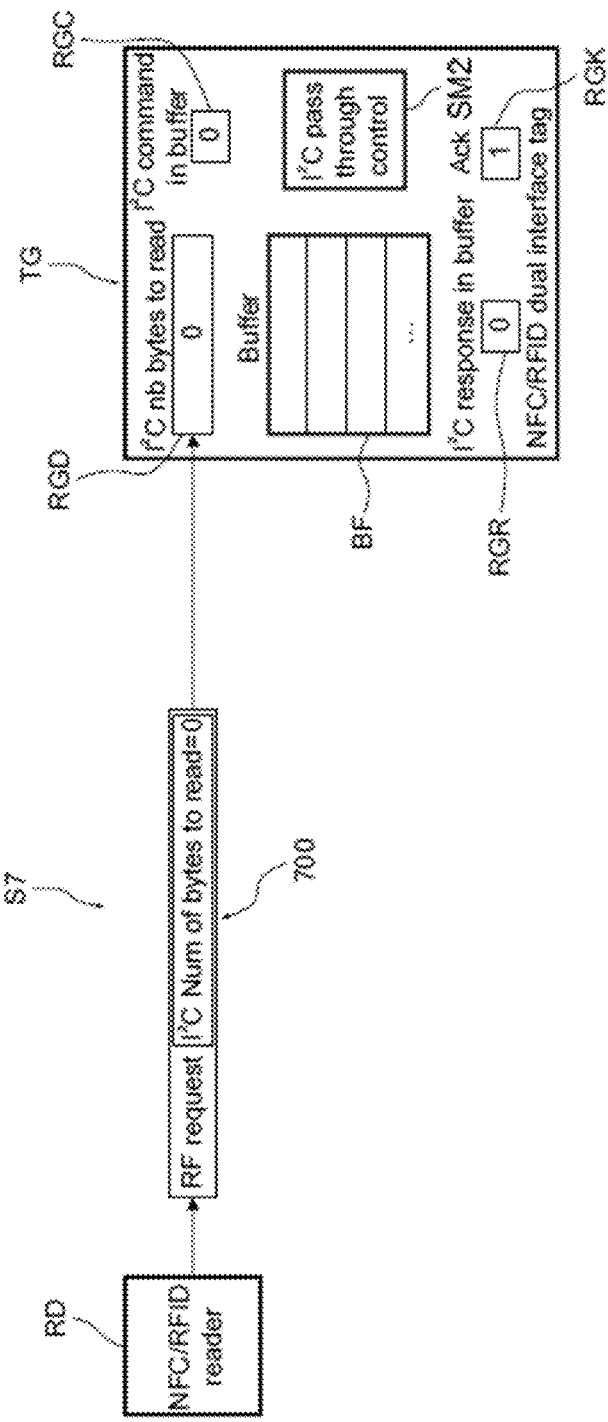

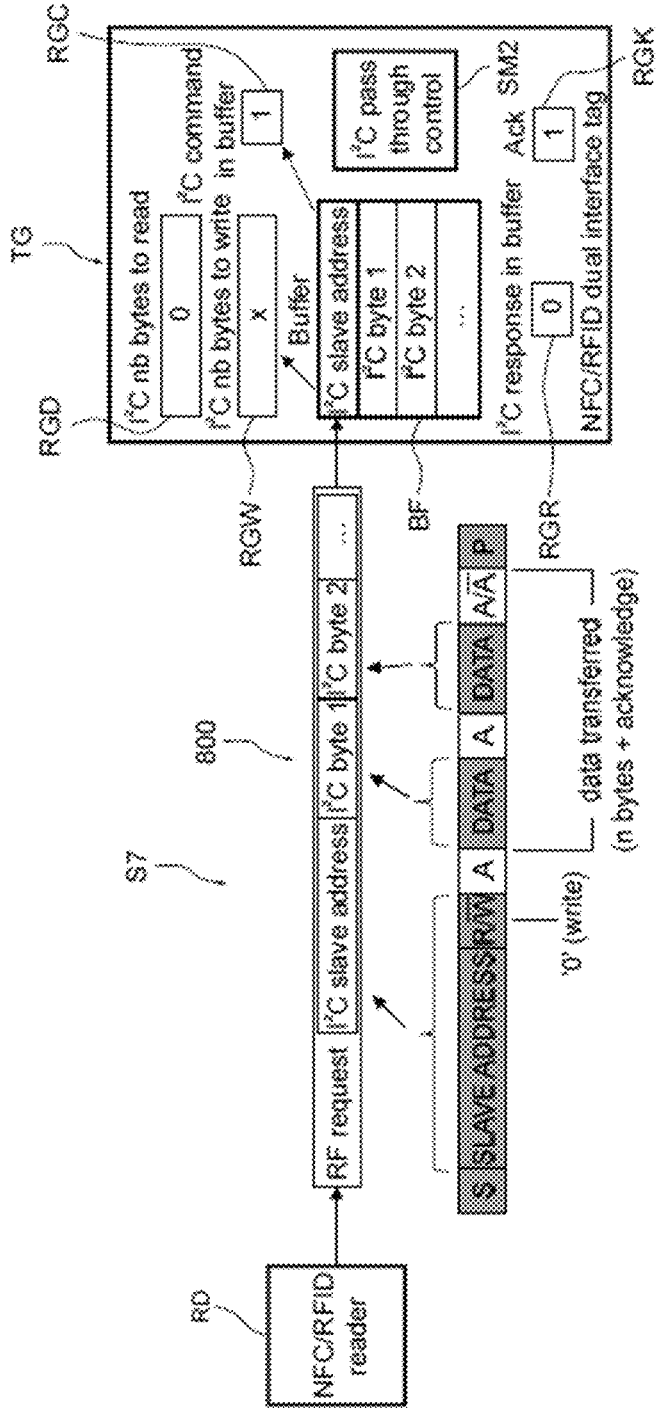

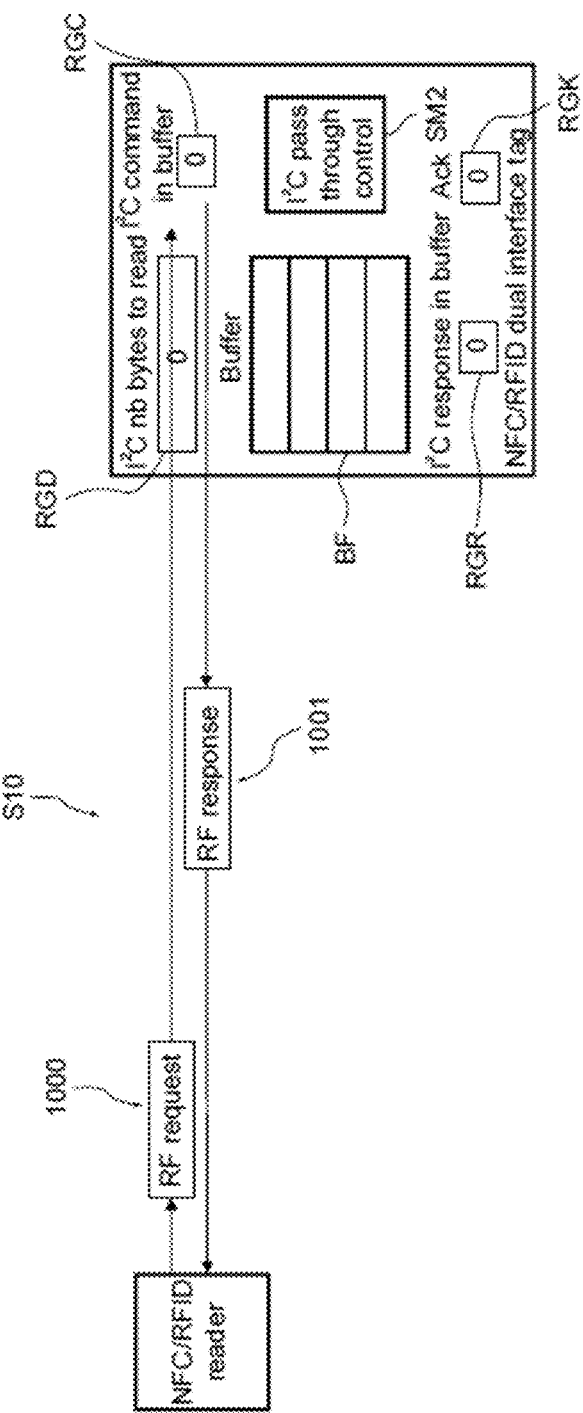

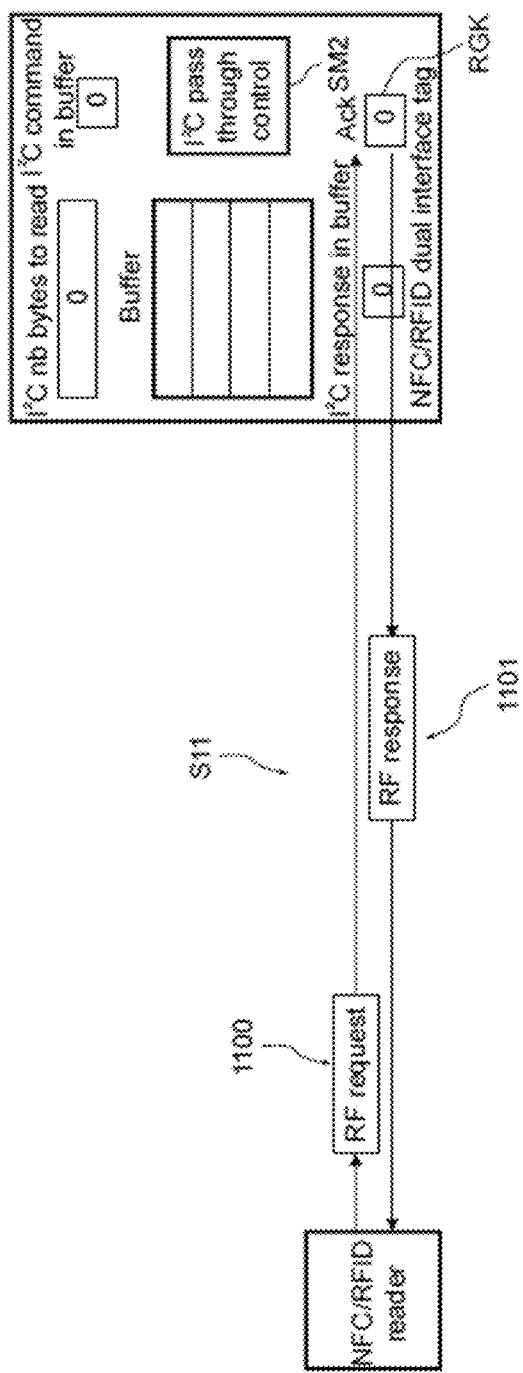

[Fig 12]
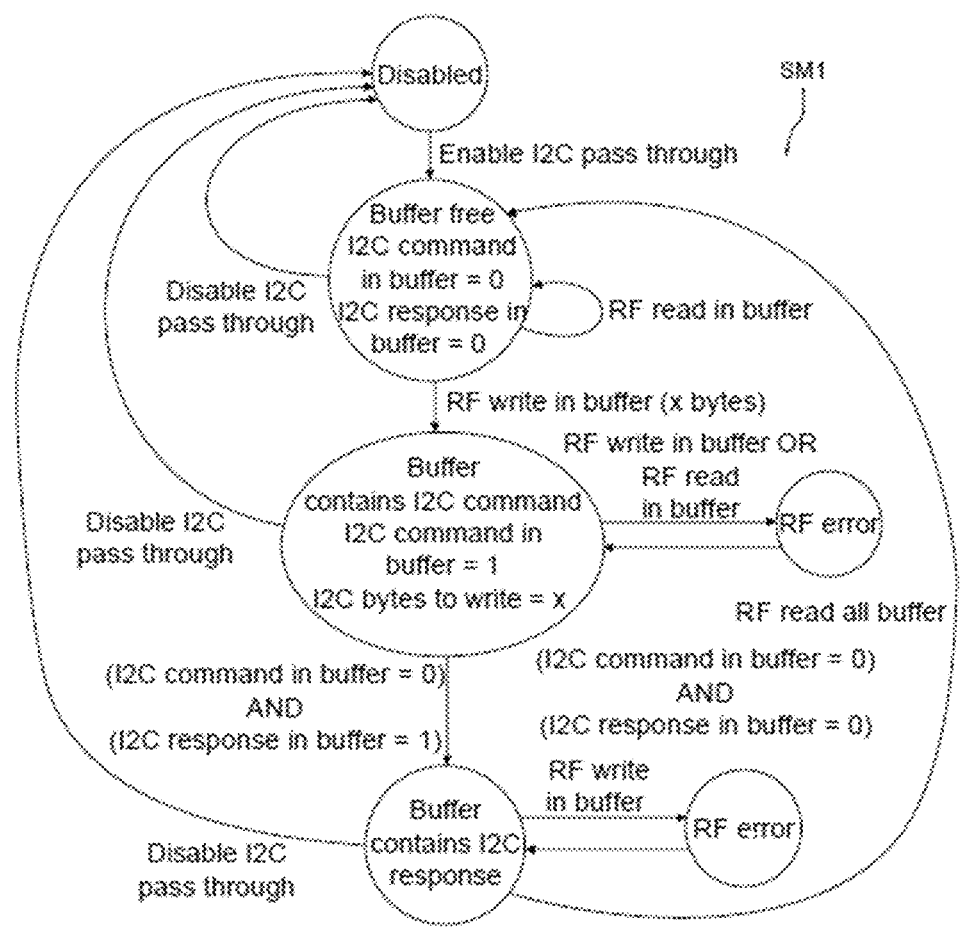

[Fig 13]
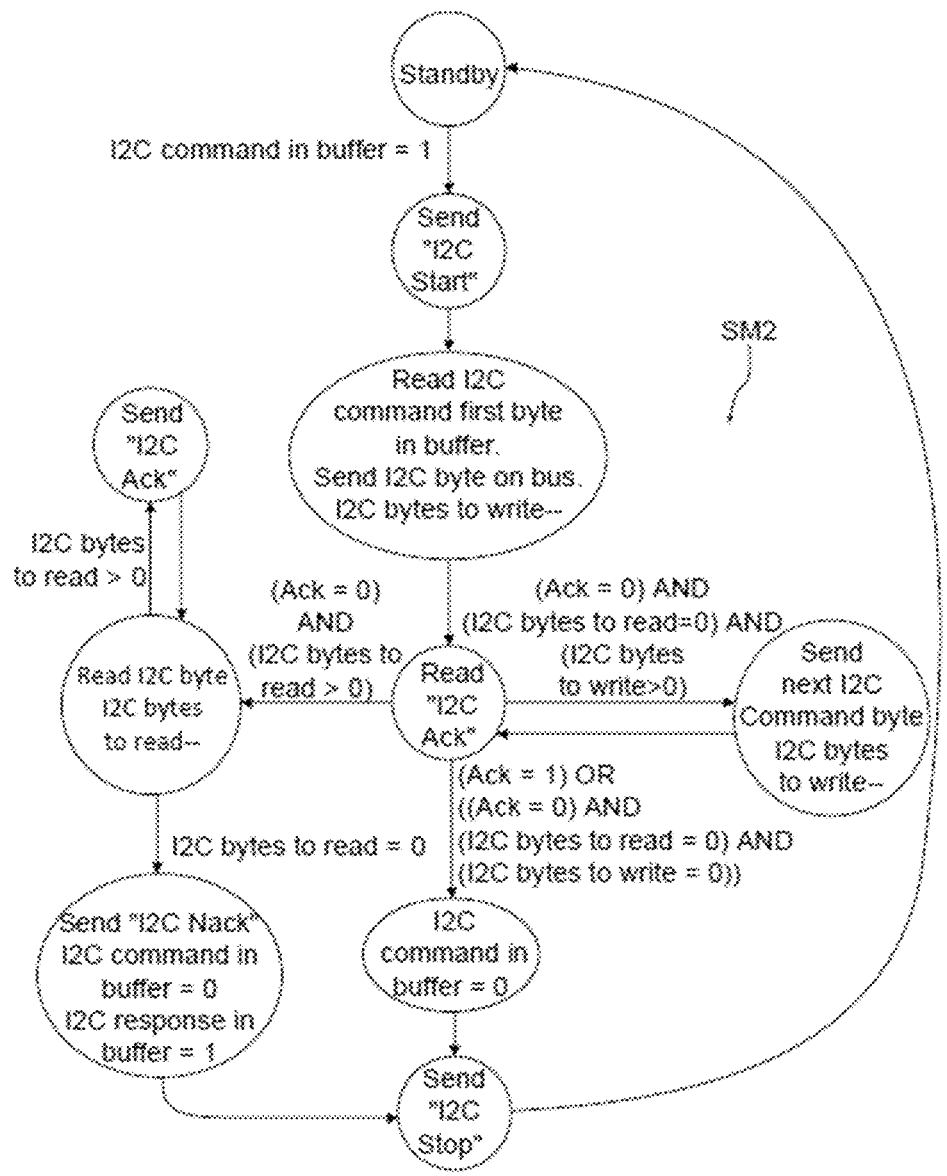

[Fig 14]
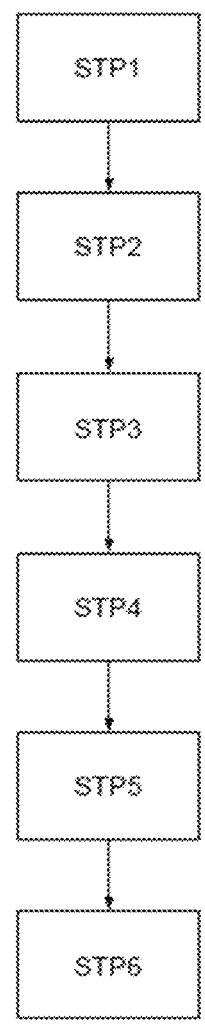

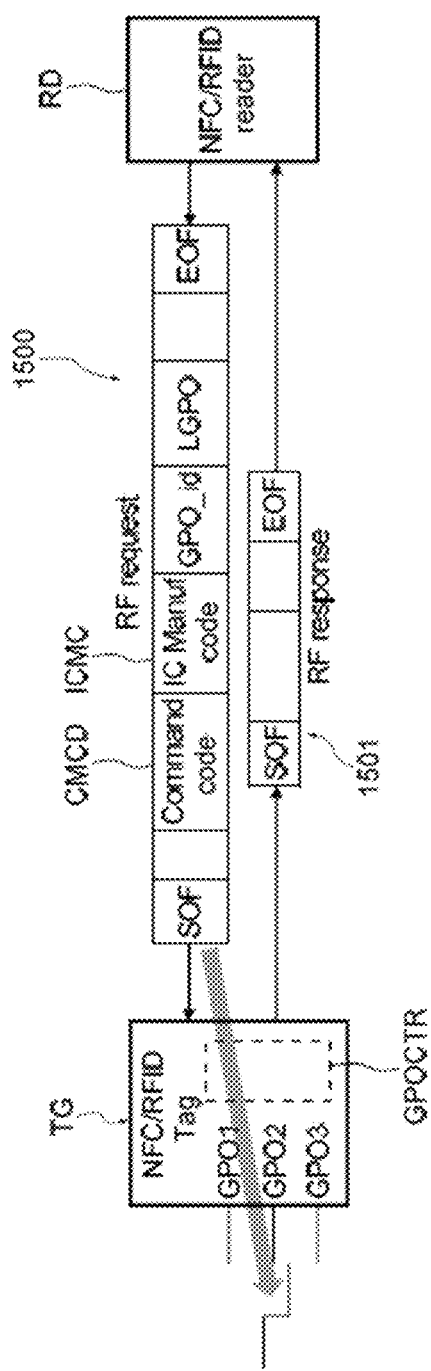

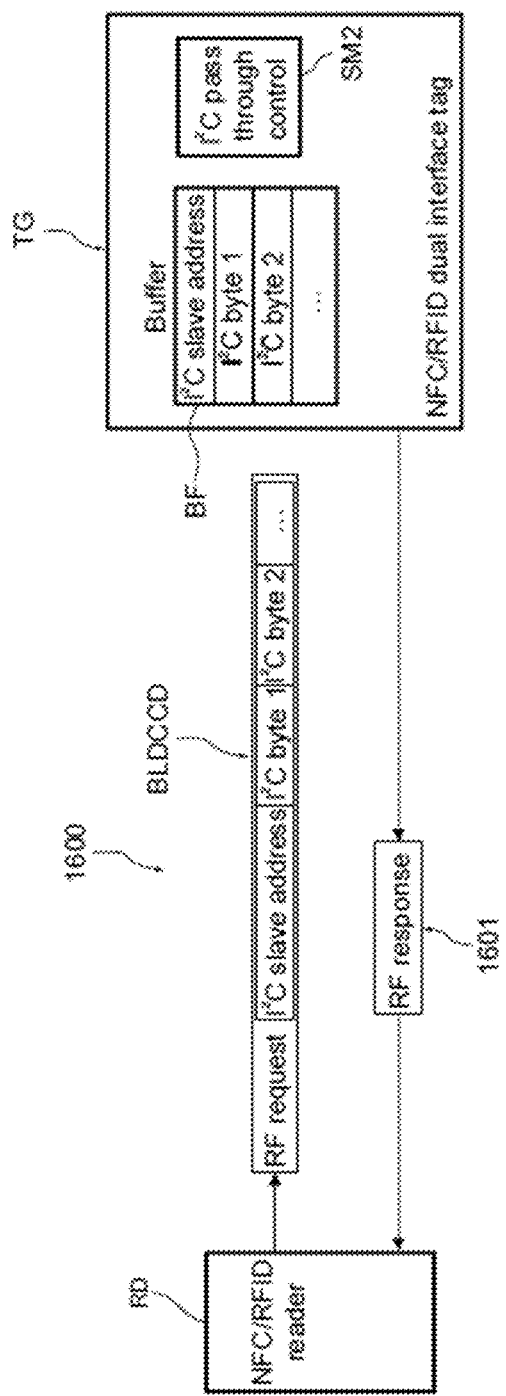

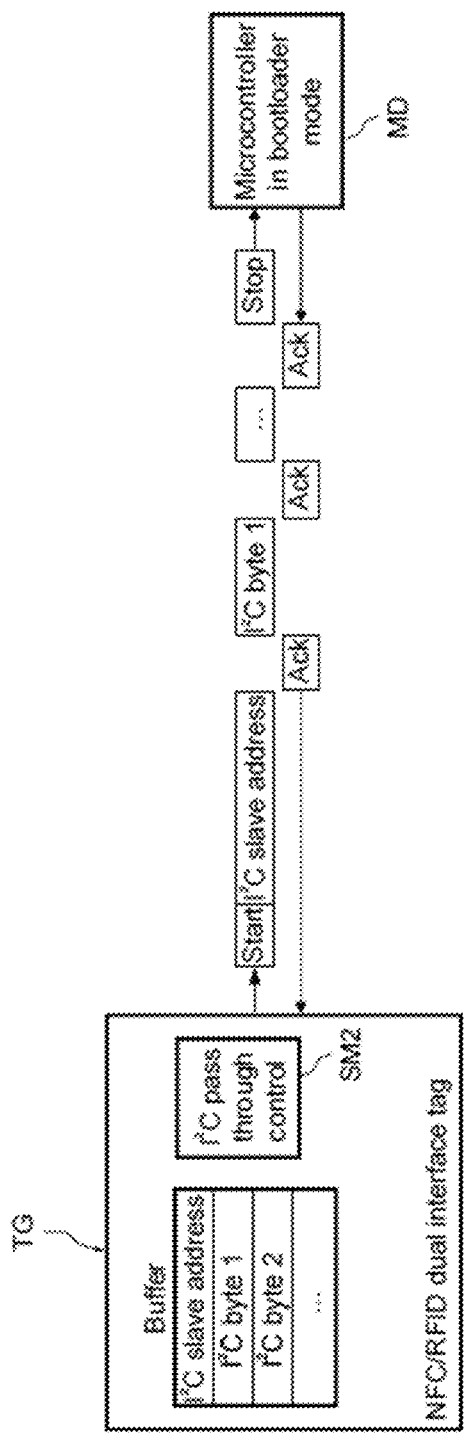

[Fig 18]
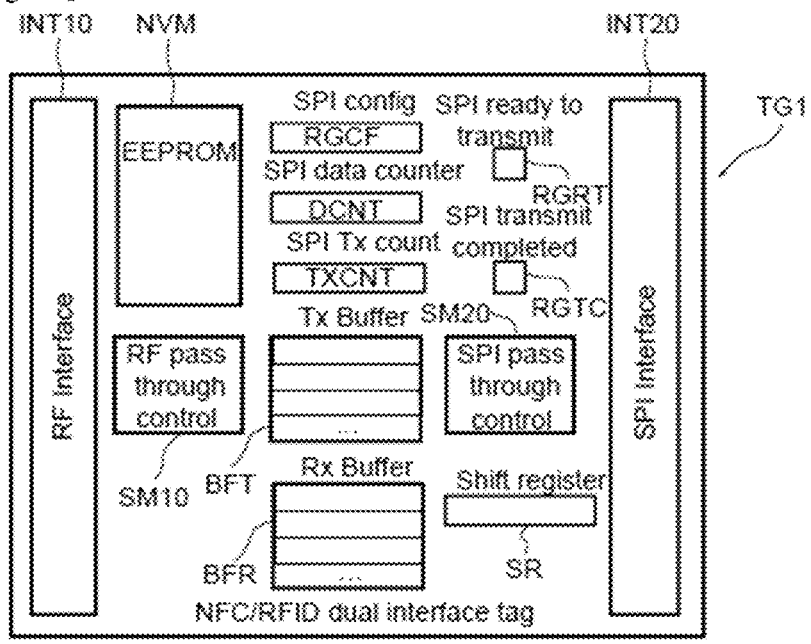
[Fig 19]
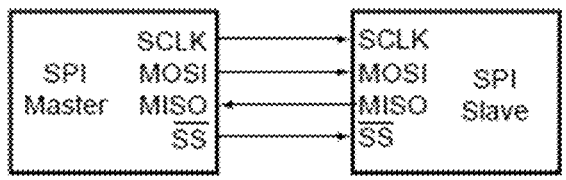
[Fig 20]
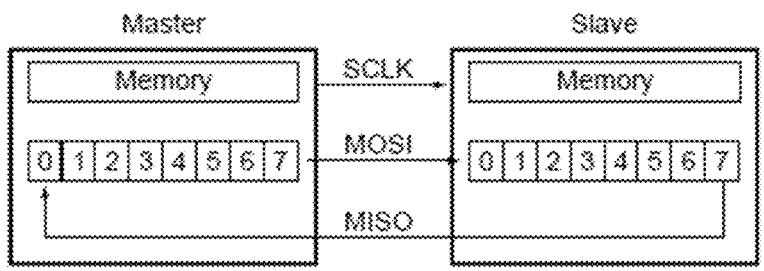

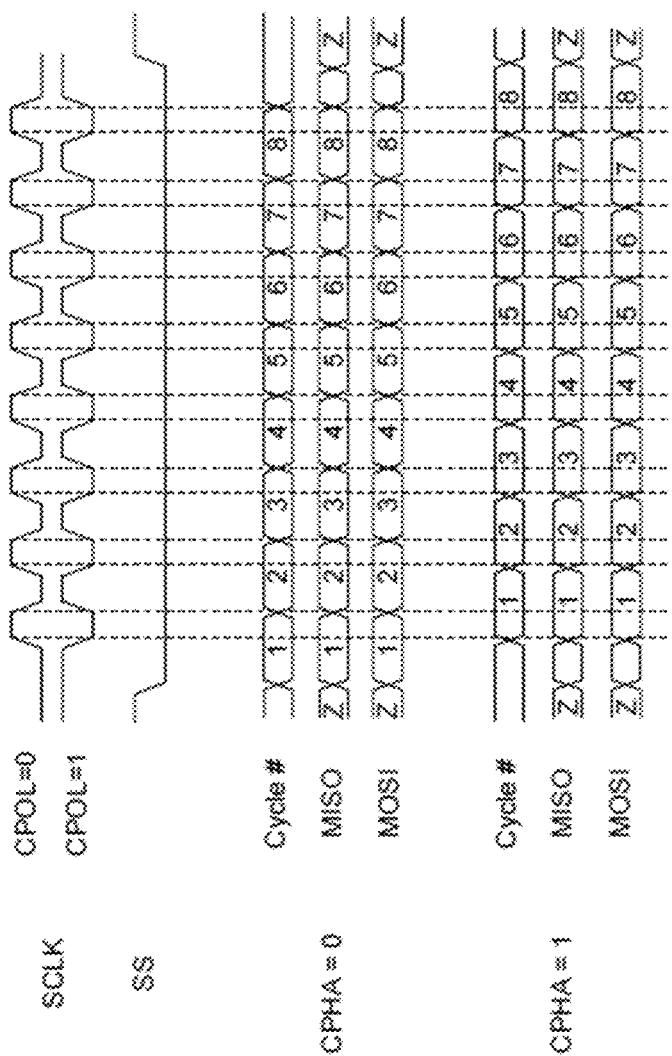
[Fig 21]

[Fig 22]
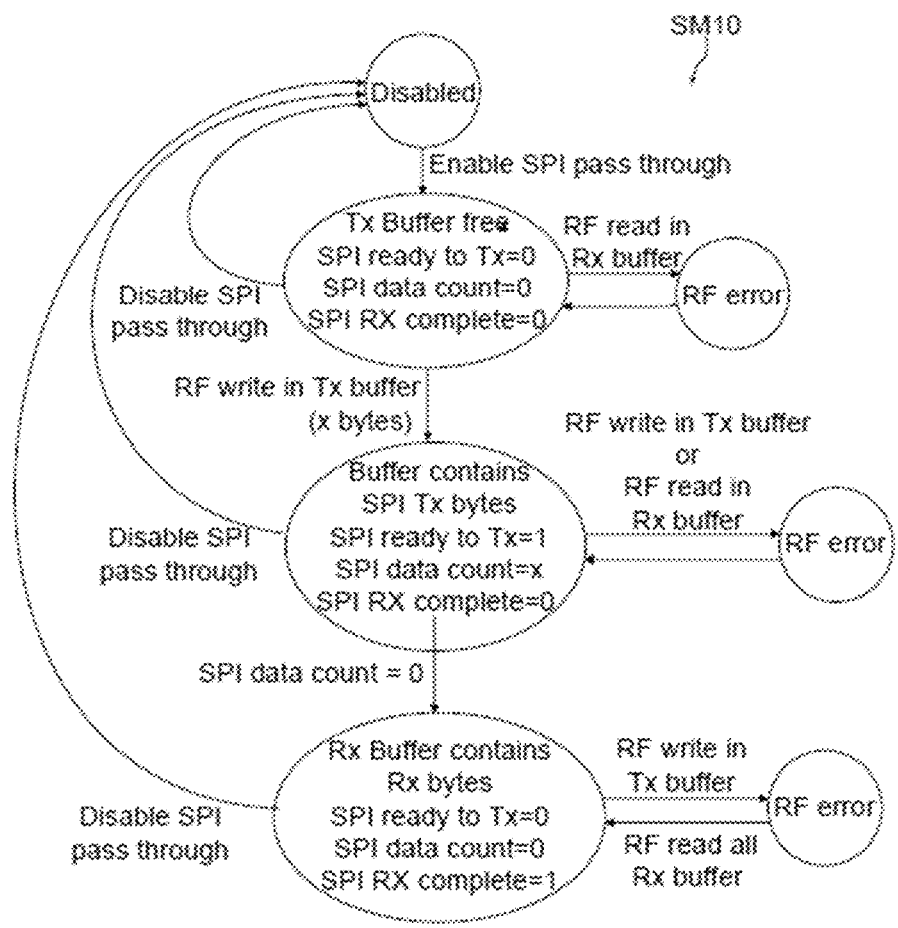

[Fig 23]
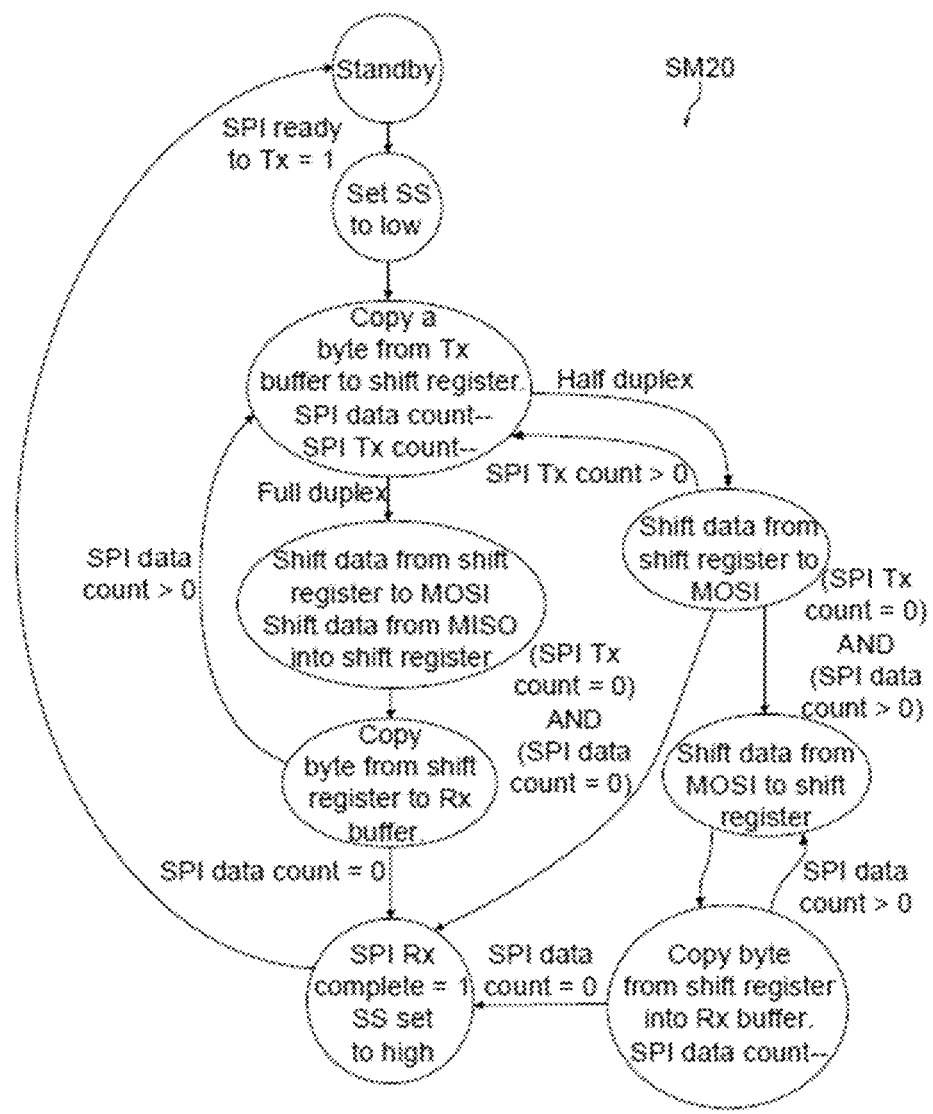

METHOD OF STORING INSTRUCTIONS IN PROGRAM MEMORY AND ASSOCIATED SYSTEM

CROSS-REFERENCE TO RELATED APPLICATIONS

This application claims priority to French Patent Application No. 2008956, filed on Sep. 3, 2020, which application is hereby incorporated herein by reference.

TECHNICAL FIELD

This application relates to storing instructions in program memory and associated system.

BACKGROUND

On a production line, firmware is downloaded into the flash memory of a microcontroller (MCU). After production, the firmware may have to be downloaded into the MCU flash for upgrade. Initial programming or upgrade programming both may need to have the product or application powered and to connect some cable, either to an external connector, or after opening the product, to an internal connector.

Such connections can be wired or wireless. Examples of known wired solution use JTAG connector. Communication buses like USB or UART is another wired solution. Known ways to avoid wiring is to use wireless communication like BlueTooth or WiFi.

SUMMARY

In an embodiment, a system includes a contactless reader and an apparatus. The apparatus includes a contactless transponder including a contactless interface and a transponder wired interface and being configured to communicate with a contactless reader according to a contactless protocol through the contactless interface. The apparatus includes a bus coupled to the transponder wired interface, and at least one module coupled to the bus, the at least one module including a processing circuit, the contactless reader being configured to communicate instructions of a software program executable by the processing circuit to the at least one module through the contactless transponder.

An embodiment includes a method for storing software program instructions in memory of at least one module having a processing circuit. The method comprises providing a transponder including a contactless interface and a transponder wired interface; coupling a bus between the transponder wired interface and the at least one module; having a reader communicate the software program instructions to the transponder through the contactless interface according to a contactless protocol; and having the transponder communicate the software program instructions on the bus to the at least one module.

BRIEF DESCRIPTION OF THE DRAWINGS

Various advantages and features of the embodiments will appear in the detailed description below and in the appended drawings which are not limitative, in which:

FIG. 1 illustrates an example of a system according to an embodiment of the invention;

FIG. 2 illustrates non limiting example of controllable energy harvesting according to an embodiment of the invention;

FIG. 3 illustrates a tag integrating a set according to an embodiment of the invention;

FIG. 4 illustrates transfer of data on the I2C bus in 8-bit packets (bytes) according to an embodiment of the invention;

FIG. 5 illustrates a master-transmitter addressing a slave receiver with a 7-bit address according to an embodiment of the invention;

FIG. 6 illustrates a master reading a slave immediately after the first byte according to an embodiment of the invention;

FIG. 7 illustrates the NFC/RFID reader sending a RF command to the NFC/RFID tag to program the number of I2C bytes to be read according to an embodiment of the invention;

FIG. 8 illustrates the NFC/RFID reader sending a RF write command to the NFC/RFID tag according to an embodiment of the invention;

FIG. 10 illustrates the NFC/RFID reader sending a RF read command to the NFC/RFID tag to check if I2C operation is terminated according to an embodiment of the invention;

FIG. 11 illustrates the NFC/RFID reader sending a RF read command to the NFC/RFID tag to read the Acknowledge bit value contained in the register RGK to check if I2C write operation was successful according to an embodiment of the invention;

FIG. 12 illustrates an example of the RF pass through state machine according to an embodiment of the invention;

FIG. 13 illustrates an example of I2C pass through state machine according to an embodiment of the invention;

FIG. 14 illustrates an example of a flowchart of a method for storing software program instructions in memory of the module according to an embodiment of the invention;

FIG. 15 illustrates a step in which the reader sends specific RF commands to the tag in order to configure the microcontroller in the bootloader mode according to an embodiment of the invention;

FIG. 16 illustrates a reader sending an RF write command to the tag according to an embodiment of the invention;

FIG. 17 illustrates embodiments of the invention using an I2C bus, and

FIG. 18 illustrates an example of a tag compatible with the use of the SPI protocol according to an embodiment of the invention;

FIG. 19 illustrates the master is connected to one or more slaves through 4 or more lines according to an embodiment of the invention;

FIG. 20 illustrates the SPI bus is full duplex based on exchange of data in a shift register according to an embodiment of the invention;

FIG. 21 illustrates data being sampled on SCLK, with configurable phase CPHA and polarity according to an embodiment of the invention;

FIG. 22 details an example of the RF pass through state machine according to an embodiment of the invention; and FIG. 23 details an example of SPI pass through state machine according to an embodiment of the invention.

DETAILED DESCRIPTION OF ILLUSTRATIVE EMBODIMENTS

Figure 9:
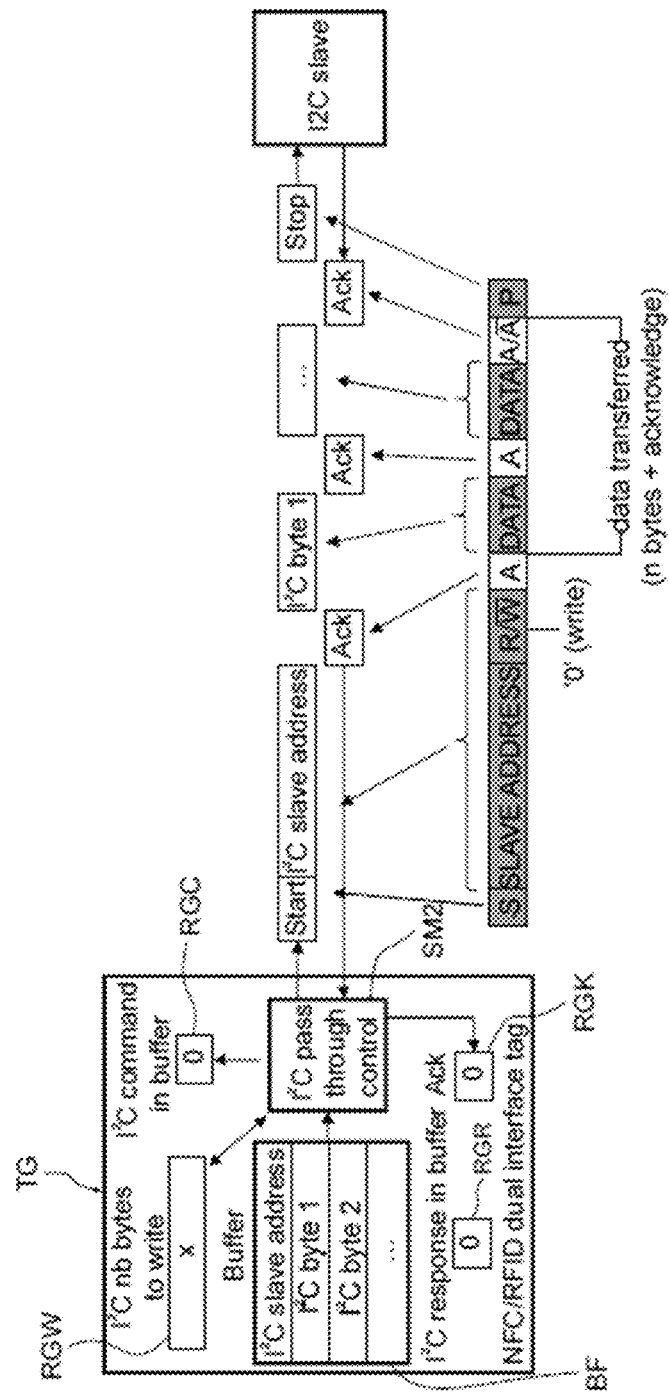
FIG. 9 illustrates the I2C pass-through state machine reading I2C bytes from buffer and sending them over the I2C bus to the corresponding slave module, adding signaling conditions according to an embodiment of the invention.

Embodiments of the invention relate to the storage of software program instructions, for example instructions of a firmware (FW), into a memory, for example in a flash memory, of a module, for example a microcontroller (MCU), having a processing circuit.

However, for initial programming or upgrade of firmware, not only power supply of the product is needed, but the product has to be opened if no specific external connector is available. To enable communication, a cable has to be connected with the MCU, which is a manual operation most of the time. Thus there is a possibility of connector break or degradation during the operation.

Further there is no possibility to program several products simultaneously (i.e. products boards boxed together), and there is no possibility to do "in box" programming, i.e., to program a fully boxed product without having physical access to the connector.

Known wired techniques such as JTAG connector require both wiring and power. Known wireless techniques like BlueTooth or WiFi do not provide power and require too much firmware to be included into a bootloader as well as prior pairing to allow communication. Thus such techniques cannot be used as an initial programming solution.

Embodiments propose a more robust programming of the product, with less manual steps in production. Embodiments also offer the possibility to program several products simultaneously.

Embodiments also offer the possibility to do "in box" programming, i.e. permitting to program the FW at very end of a production line, which allow customization at end of the production line. Embodiments also offer product maintenance reduction and simplification.

According to an embodiment, it is proposed to use a contactless transponder (for example, a NFC transponder) contactlessly cooperating with a contactless reader (for example, a NFC reader) and cooperating with a processing circuit of a module, for example a microcontroller, to be programmed through a wired bus, for example an I2C or a SPI bus, and to transmit the program instructions from the reader to the module through the transponder.

There is thus no need to open the product (module) to connect a cable or to have an external connector, leading to less manual steps in production line. Accordingly, embodiments offer a better robustness of the product or application (no connector wearing). The product maintenance is reduced and simplified.

It is also possible to program several modules simultaneously (all modules present in the same RF field can be programmed at same time).

There is also a possibility to do "in box" programming, with for example a programming of the FW at very end of production line, which allow customization at end of production line.

There is no need to internally power the module (microcontroller for example) as the power can come from the transponder if it is provided with a battery for example or from the reader field.

According to an aspect a system is proposed, comprising a contactless reader and an apparatus, for example an IOT (Internet Of Things) object, a connected watch, a connected gas meter, without these examples being limiting.

Said apparatus includes a contactless transponder, for example a NFC/RFID transponder.

Said transponder includes a contactless interface and a transponder wired interface and is configured to communicate with said reader according to a contactless protocol through said contactless interface.

Said apparatus includes a bus, for example an inter-integrated circuit (I2C) bus or a SPI bus or a so called SMBus, coupled to the transponder wired interface and at least one module, for example a microcontroller, coupled to said bus.

Said at least one module includes a processing circuit.

Said reader is configured to communicate instructions of a software program, for example instructions of a firmware, executable by the processing circuit to the at least one module through the transponder.

Embodiments of the invention are particularly applicable to NFC transponders, for example labels (tags), intended to serve as a bridge between said external contactless communication device (reader), for example a cellular mobile phone, better known under the name of "smartphone" and the module (s) of the apparatus.

Such transponders serving as a gateway may also be called "dynamic transponders" or "dynamic tags".

Near field communication, better known to those skilled in the art under the name NFC (Near Field Communication), is a wireless connectivity technology that allows communication over a short distance, for example 10 cm, between electronic devices, such as contactless smart cards or labels, and readers.

NFC technology is particularly suitable for connecting any type of user device and allows for quick and easy communications.

A contactless transponder is a transponder capable of exchanging information via an antenna with a contactless reader, according to a contactless communication protocol.

An NFC transponder, which is a contactless transponder, is a transponder compatible with NFC technology.

NFC technology is an open standard technology platform in ISO/IEC 18092 and ISO/IEC 21481 but incorporates many existing standards such as the Type A and Type B protocols defined in ISO-14443 which can be communication protocols that can be used in NFC technology.

Contactless technology can also be used in Radio Frequency IDentification (RFID) transponders compatible with ISO 15693 and ISO 18000-3.

When transmitting information between a reader and a transponder, the reader generates a magnetic field via its antenna which is generally in the standards conventionally used, a sine wave (the carrier) at 13.56 MHz.

To transmit information from the reader to the transponder, the reader uses an amplitude modulation of said carrier.

The transponder comprises processing circuitry configured to demodulate the received carrier in order to obtain the data transmitted from the reader.

For an information transmission from the transponder to the reader, the reader generates the magnetic field (the carrier) without modulation.

The transponder antenna then modulates the field generated by the reader, according to the information to be transmitted. The frequency of this modulation corresponds to a subcarrier of said carrier. The frequency of this subcarrier depends on the communication protocol used and can be for example equal to 848 kHz.

This modulation is performed by modifying the load connected to the terminals of the transponder antenna.

Two modes of operation are then possible, a passive mode or an active mode.

In the passive mode, the transponder retro-modulates the wave coming from the reader to transmit information and does not integrate, for the transmission of information, transmission circuit themselves, or emitter, capable for example of generating its own magnetic field during the broadcast. Such a transponder devoid of transmitter is called passive transponder, as opposed to an active transponder which includes a transmitter.

Generally a passive transponder is devoid of power because it uses the wave from the reader to power its integrated circuit.

In some applications the passive transponder may incorporate a power supply, for example a battery.

In the active mode of operation, both the reader and the active transponder generate an electromagnetic field. Generally, this mode of operation is used when the active transponder is provided with a power source, for example a battery.

Each of the NFC devices (reader and transponder) transmits the data using a modulation scheme. Here again, the modulation results in a load modification and this is then referred to as active load modulation communication.

Compared to a passive communication mode, larger operating distances of up to 20 cm are obtained depending on the protocol used.

Moreover, the use of active load modulation makes it possible to use very small antennas.

Embodiments of this disclosure applies preferentially to passive transponders but is also compatible with active transponders.

Although it would be possible to have a master inside the module, the reader and the transponder are, according to an advantageous embodiment, configured so that the reader is the master on said bus during the communication of said instructions.

Although the reader is not directly connected to the wired communication bus, the reader can be considered to be actually the master of the application or the master on the bus, on a system point of view, because it initiates commands within frames consistent with said contactless protocol, and those commands will be transformed by the transponder into commands on the bus consistent with the protocol used on said bus.

The wired interface of the tag, which is actually connected to the bus, is a master interface on the physical point of view.

Thus it can be also said that the reader is the master on the bus through the master wired interface.

With such an embodiment, there is thus no need to have a master inside said at least one module, which leads to an apparatus cost reduction, a development simplification, a maintenance reduction and simplification and an apparatus size reduction.

Said transponder is advantageously a gateway during a direct communication of the software program instructions between said reader and said at least one module through said transponder.

Said at least one module is also advantageously configured to directly communicate with the reader through said transponder, i.e. without passing through any microcontroller.

According to an embodiment, said at least one module comprises memory, for example a flash memory, a bootloader and a bootloader mode in which the bootloader is configured to store said instructions into said memory.

As it is well known by the man skilled in the art, the bootloader is stored in the internal boot ROM memory (system memory) of the microcontroller. It is programmed by microcontroller manufacturer during production. Its main task is to download the firmware to the internal Flash memory through the serial interface (I2C, SPI, etc.).

Once in bootloader mode, the microcontroller is watching serial interface to detect programming commands.

A communication protocol is defined for each serial interface, with a compatible command set and sequences.

The bootloader may be usually activated by setting dedicated microcontroller's pin(s) to a given level, and/or internal configuration bits that allow activating this mode.

However, the bootloader mode may be active in different ways. For example, the microcontroller may boot automatically in bootloader mode if the memory flash is empty. In case of firmware update, the microcontroller may be placed in its bootloader mode by performing a jump to system memory from user code. In such case, there is no need to set specific pins at specific voltage level.

Bootloader mode can be exit by getting out from bootloader activation condition and generating hardware reset or jumping to user code.

According to an embodiment, said reader is further configured to activate the bootloader mode through the transponder.

For example, said at least one module has at least one module terminal dedicated to the activation of the bootloader mode and said transponder has at least one transponder terminal coupled to said at least one module terminal and control circuit configured to set said at least one transponder terminal at one or at least one voltage level in response to a bootloader mode activation command received from the reader through the contactless interface.

According to another aspect a transponder is proposed belonging to the system defined above.

More particularly, the transponder may comprise pass-through circuit configured to implement a pass-through function for message exchange between the reader and said at least one module during communication of the instructions of the software program.

The reader may be configured to initiate at least one first bootloader command within at least one frame consistent with said contactless protocol, said at least one first bootloader command containing first data payload including the instructions of the software program, and said pass-through circuit may be configured to transform said at least one first bootloader command into at least one second bootloader command on the bus consistent with a protocol used on said bus.

According to an embodiment, said pass-through circuit comprises first volatile memory configured to buffer said first data payload and second data payload of responses intended to be sent to the reader through said contactless interface.

According to an embodiment, said pass-through circuit further comprises second volatile memory configured to store control data, said pass-through circuit being configured to implement said pass-through function for message exchange between the reader and said at least one module, on the basis of said control data.

According to an embodiment, said pass-through circuit further comprises a first state machine configured to cooperate with said reader through the contactless interface and configured to write/read said first memory and a part of said second memory based on commands received from the reader, a second state machine configured to cooperate with said bus through said wired interface based on the content of a part of said second memory and configured to write/read said first memory and a part of said second memory.

According to an embodiment, said second state machine is configured to read said first data payload from the first volatile memory and to execute them on the bus, to manage the clock and all bus protocol signaling information.

According to an embodiment, said second state machine is configured to read the bus answers and to store them in the first volatile memory for them to be read by the first state machine.

When said bus is an I2C bus, said at least one first bootloader command initiated by the reader may comprise at least one request of a write operation into said at least one module.

Said at least one request of a write operation into said at least one module may comprise the address of said at least one module, a specific command code and at least some of the instructions to be written in said memory.

When said bus is a SPI bus, said at least one first bootloader command initiated by the reader may comprise at least one write command.

According to an advantageous embodiment, the transponder comprises controllable energy harvesting circuit configured to power said at least one module, and the reader is configured to send a specific command to the transponder in order to activate said energy harvesting circuit.

According to another aspect it is also proposed a reader belonging to a system as defined above According to another aspect, it is also proposed an apparatus belonging to a system as defined above.

According to another aspect, a method is proposed, for storing software program instructions in memory of at least one module having a processing circuit.

Said method comprises providing a transponder including a contactless interface and a transponder wired interface, coupling a bus between said transponder wired interface and said at least one module, having said reader communicate said software program instructions to the transponder through the contactless interface according to a contactless protocol, having the transponder communicate the software program instructions on the bus to said at least one module.

According to an embodiment said method further comprises having the reader act as the master on said bus during the communication of said software program instructions.

According to an embodiment, said method comprises providing said at least one module with memory and a bootloader, placing the at least one module in a bootloader mode, having the bootloader store said software program instructions into said memory.

According to an embodiment, said method further comprises having the reader activate the bootloader mode through the transponder.

According to an embodiment, said method further comprises providing said at least one module with at least one module terminal dedicated to the activation of the bootloader mode, providing said transponder with at least one transponder terminal coupled to said at least one module terminal, having the reader send a bootloader mode activation command to the transponder through the contactless interface and having the transponder set said at least one transponder terminal at at least one voltage level in response to said bootloader mode activation command.

According to an embodiment, said method further comprises, by the transponder: storing control data, and implementing a pass-through function for message exchange between the reader and said at least one module on the basis of said control data, during communication of the instructions of the software program.

According to an embodiment, said method comprises having the reader initiate at least one first bootloader command within at least one frame consistent with said contactless protocol, said at least one first bootloader command containing first data payload including the instructions of the software program, and having said pass-through function transform said at least one first bootloader command into at least one second bootloader command on the bus consistent with a protocol used on said bus.

According to an embodiment, said method further comprises providing the transponder with controllable energy harvesting circuit configured to power said at least one module, and having the reader send a specific command to the transponder in order to activate said energy harvesting circuit.

As shown on FIG. 1, which illustrates an example of a system SYS according to an embodiment of the invention, a NFC/RFID reader RD can act as the I2C master of the application or apparatus APP to deliver instructions of a firmware to a module MD, for example a microcontroller, including a processing circuit PRU configured to execute said firmware.

In other words, the reader RD is configured to directly communicate with the module MD of the apparatus APP through a contactless interface INT1 of a NFC/RFID dual interface transponder (or tag) TG.

Although the reader RD is not directly connected to the bus BS, here an I2C bus, the reader RD can be considered to be actually the master of the application or the master on the I2C bus, because it initiates commands within RF frames, and those commands will be transformed into I2C commands the I2C bus consistent with the I2C protocol.

The I2C interface INT2 of the tag or transponder TG, is actually connected to the I2C bus BS. This interface, also called wired transponder interface INT2, is a master interface.

Thus it can be also said that the reader is the master on the bus BS through the I2C master interface INT2.

The module MD comprises also an I2C slave interface INTD connected to the bus BS, and memory MF, such as a flash memory, intended to store the firmware.

The module MD comprises also a bootloader BLD, known per se, and at least one module terminal, here three module terminals GPC1-GPC3, respectively coupled to three transponder terminals GPO1-GPO3.

The tag TG comprises also control circuit GPOCTRL configured to set said the transponder terminal GPO1-GPO3, and consequently the module terminals GPC1-GPC3 at respective voltage level in response to a bootloader mode activation command received from the reader through the contactless interface INT1.

In the present example, upon reception of this bootloader mode activation command, the module is placed in a bootloader mode and the bootloader is activated.

This will be explained more in details thereafter.

In this embodiment the tag TG comprises also controllable energy harvesting circuit EHM, having a structure known per se, configured to power the module MD with power voltage VCC, and the reader is configured to send a specific command to the transponder in order to activate said energy harvesting circuit EHM.

More precisely, a non limiting example of controllable energy harvesting circuit EHM is diagrammatically illustrated in FIG. 2.

When the NFC/RFID tag TG is receiving more power than necessary to power itself from the RF field generated by the reader, a part of the energy received can be used to power an external device, her the module MD.

The circuit EHM can embed a diode rectifier bridge RBR, which output is controlled by a MOS switch MSW.

When the MOS switch MSW is opened, no voltage is delivered on the EHM output EHMS.

When the MOS switch MSW is closed, rectified voltage from antenna coils ANT1 of the tag is delivered on the output EHMS to power the external device (i.e. the module or microcontroller MD).

The EHM On/Off switch can be controlled through a dedicated command EHMCTRL.

In addition to the circuit which have just been described, the tag TG integrates a set ENS of circuit illustrated more particularly on FIG. 3.

Such a tag TG may be used as a gateway for permitting exchanges of messages between the reader and the module MD, the reader being the master and the wired interface INT2 being the master on the bus BS during this exchange.

Examples of such a tag and its operation have been described in the PCT application filed on May 14, 2020 under the no PCT/EP2020/063427.

The man skilled in the art may refer to this PCT application.

This PCT application is here incorporated by reference.

Some features of the tag as well as some exchange steps more particularly used in the present invention are now reminded.

As shown on FIG. 3, the tag TG integrates, within the set of circuit ENS of FIG. 1:

A non volatile memory NVM, for example an EEPROM,

First volatile memory, like a buffer BF (FIFO), to store I2C bytes,

Second volatile memory, including a plurality of registers, for example the following ones:

A register RGW to store the number of I2C bytes to write

A register RGD to store the number of I2C bytes to read

A register RGC (containing one bit) to signal that I2C command is present in buffer BF A register RGR (containing one bit) to signal that I2C response is present in buffer BF A register RGK (containing one bit) to record Ack bit value. This register RGK is reset on read.

A state machine SM1 for RF pass through control

A state machine SM2 for I2C pass through control.

Such a tag TG may be realized for example by an integrated circuit or chip, for example from an integrated circuit of the integrated circuits family having the reference ST25 at STMicroelectronics.

The I2C protocol is well known by the man skilled in the art and can be found in the I2C specification. Some features of the I2C protocol are now reminded.

The I2C bus uses two wires: serial data (SDA) and serial clock (SCL).

All I2C master and slave devices are connected with only those two wires.

A device acting as a master generates bus clock and initiates communication on the bus, other devices are slaves and respond to the commands on the bus.

In order to communicate with specific device, each slave device must have an address which is unique on the bus.

I2C master device does not need an address since no other (slave) device sends commands to the master.

Both signals SCL and SDA are bidirectional.

For each clock pulse one bit of data is transferred. The SDA signal can only change when the SCL signal is low. When the clock is high, the data should be stable.

Each I2C command initiated by master device starts with a START condition and ends with a STOP condition. For both conditions SCL has to be high. A high to low transition of SDA is considered as START and a low to high transition as STOP.

After the Start condition the bus is considered as busy.

After the Start condition the master can generate a repeated Start. This is equivalent to a normal Start and is usually followed by the slave I2C address.

FIGS. 4, 5 and 6 (extracted from I2C specification version 6.0, Apr. 4, 2014) illustrate features of the I2C protocol.

As illustrated in FIG. 4, data on the I2C bus is transferred in 8-bit packets (bytes). There is no limitation on the number of bytes, however, each byte must be followed by an acknowledge bit ACK from a slave device. This bit ACK signals whether the slave device is ready to proceed with the next byte. For all data bits and the acknowledge bit ACK, the master must generate clock pulses. If the slave device does not acknowledge transfer, this means that there is no more data or the device is not ready for the transfer yet. The master device must either generate Stop or Repeated Start condition.

Data is transferred with the Most Significant Bit (MSB) first. If a slave cannot receive or transmit another complete byte of data until it has performed some other function, for example servicing an internal interrupt, it can hold the clock line SCL LOW to force the master into a wait state. Data transfer then continues when the slave is ready for another byte of data and releases clock line SCL.

As illustrated in FIGS. 5 and 6, each slave device on the bus should have a unique 7-bit address.

The communication starts with the Start condition, followed by the 7-bit slave address and the data direction bit R/W.

If this bit R/W is 0 (FIG. 5) then the master will write to the slave device. Otherwise, if the data direction bit R/W is 1, the master will read from slave device (FIG. 6).

After the slave address and the data direction bit R/W are sent, the master can continue with reading or writing.

The communication is ended with the Stop condition which also signals that the I2C bus is free.

If the master needs to communicate with other slaves it can generate a repeated start with another slave address without generation Stop condition.

If the master only writes to the slave device. Then the data transfer direction is not changed (FIG. 5) The slave receiver acknowledges each byte.

If the master only needs to read from the slave device then it simply sends the I2C address with the R/W bit set to read. After this the master device starts reading the data. (FIG. 6).

At the moment of the first acknowledge, the master-transmitter becomes a master-receiver and the slave-receiver becomes a slave-transmitter. This first acknowledge A is still generated by the slave. The master generates subsequent acknowledges. The STOP condition is generated by the master, which sends a not-acknowledge just before the STOP condition.

FIGS. 7-11 explain an example of successive steps of the process of writing bytes into a slave module, those bytes being sent by the reader RD in order to be transmitted to the slave module of the apparatus APP.

As it will be explained more in details thereafter, this process of writing bytes will be used for transmitting the firmware instructions to the slave module MD from the reader RD.

As illustrated in FIG. 7, the NFC/RFID reader RD sends (step S7) a RF command 700 to the NFC/RFID tag to program the number of I2C bytes to be read.

The RF command 700 has a conventional structure compliant with the used RF protocol, and the number of I2C bytes to be read is included in the data payload of the RF command 700.

Here the value of the number of I2C bytes to be read is equal to 0 as there is no byte to be read on I2C bus.

This number of I2C bytes to be read is extracted from the RF command by the state machine SM1 (RF pass through control) and written in the register RGD by the state machine SM1 also (RF pass through control).

The register RGC and the register RGR contain a 0 value while the register RGK contains a 1 value.

As illustrated in FIG. 8, the NFC/RFID reader RD sends (step S8) a RF write command 800 to the NFC/RFID tag.

This RF command 800 contains I2C bytes to be written on I2C bus as well as the I2C slave address of the slave module intended for receiving those I2C bytes.

The I2C slave address and the I2C bytes form a complete I2C message intended for being delivering to the I2C bus but without I2C signaling information, i.e. without here the start and stop conditions.

The I2C slave address, which is the first byte, includes the R/W bit which is set to "write".

This toggles the "I2C command in buffer" bit of the register RGC

In other words, the register RGC is set to 1 by the state machine SM1 (RF pass through control).

The state machine SM1 (RF pass through control) stores the x I2C bytes into the buffer BF and updates the register RGW with this I2C number x of bytes to write in the designated slave module.

As illustrated in FIG. 9, the I2C pass-through state machine SM2 reads I2C bytes from buffer BF and sends them over the I2C bus to the corresponding slave module, adding signaling conditions (Start and Stop conditions).

This toggles the "I2C command in buffer" bit of the register RGC

In other words the register RGC is reset to 0 by the state machine SM2.

The I2C pass-through state machine SM2 reads the Acknowledge bits from I2C bus sent by the I2C slave module and stores value 0 in the "Ack" register bit RGK.

As illustrated in FIG. 10, the NFC/RFID reader RD sends (step S10) a RF read command 1000 to the NFC/RFID tag to check if I2C operation is terminated (polling).

Upon receipt of this RF read command 1000, the RF state machine SM1 reads reading the "I2C command in buffer" bit contained in the register RGC.

The value of this bit is sent to the reader RD via a RF response 1001 having a conventional structure compliant with the used RF protocol.

If the value of this bit is 0, the I2C write operation is over.

As illustrated in FIG. 11, the NFC/RFID reader RD sends (step S11) a RF read command 1100 to the NFC/RFID tag to read the Acknowledge bit value contained in the register RGK to check if I2C write operation was successful. The write operation is successful if the Acknowledge bit value is 0.

More precisely, this RF command 1100 is processed by the RF state machine SM1 which reads the value contained in the register RGK, sends it via a RF response 1101 to the reader RD and resets the value of the register RGK to the value 1.

As it can be seen from explanations related to FIGS. 7-11, the registers RGD, RGW, RGC, RGR, RGK contain control (called also configuration) data (one or several bits) which permit for example to determine the presence or the absence of an operation to be executed, the type of operation (write or read operation) or the status of the operation (terminated for example) or the result of the operation (successful for example).

Those control registers are read and/or written—by the RF state machine SM1 upon reception of a RF command (request) sent by the reader, or—by the I2C state machine SM2.

More precisely, registers RGD, RGW and RGC are written by the RF state machine SM1.

For example, if the register RGC contains value 0, it means that there is no I2C command to be executed by the I2C state machine SM2.

If the register RGC contains value 1, it means that there is an I2C command to be executed by the I2C state machine SM2, this command being either a write operation or a read operation.

The type of operation (read or write) is determined by the contents of registers RGD and RGW.

More precisely if the value contained in the register RGD is nul and the value contained in the register RGW in not nul, the operation requested by the reader is a write operation.

If the value contained in the register RGW is nul and the value contained in the register RGD in not nul, the operation requested by the reader is a read operation.

The register RGW and the register RGD are also read by the state machine SM2 to know the number of bytes to write or read in the designated slave module.

The register RGC is also read by the state machine SM2 to know if a command is to be executed on the bus and also written by the state machine SM2 when the execution of the command has started.

The register RGC is also read by the state machine SM1 upon request of the reader to know if the execution of a requested command is terminated.

The register RGR is written by the state machine SM2 to indicate that read bytes are stored in the buffer BF, and the register RGR is also read by the state machine SM1 upon request of the reader to check if the I2C read operation is terminated.

The register RGK (for example initially set to 1) is written by the state machine SM2 upon reception of Ack bits, read by the state machine SM1 upon request of the reader RD to check whether the read or write operation is successful, and reset to 1 by the state machine SM1.

Among those control data, the data contained in registers RGD and RGW are control data sent within or deduced from the data payload of the commands sent by the reader and defining if a command from the reader is a write operation or a read operation in the designated slave module.

The data contained in register RGC is a control data defining the presence or the absence of an operation to be executed on said bus.

The data contained in register RGC is also a control data indicating whether the execution of a write operation requested by the reader is terminated and the data contained in register RGR is a control data indicating whether the execution of a read operation requested by the reader is terminated.

The data contained in register RGR is also a control data indicating whether the result of a read operation requested by the reader is stored in the transponder.

The data contained in the register RGK is a control data indicating whether a read or write operation requested by the reader is successful.

FIG. 12 details an example of the RF pass through state machine SM1 and FIG. 13 details an example of I2C pass through state machine SM2, both permitting to implement in particular the steps disclosed in FIGS. 7-11.

After having reminded those general considerations, we refer now more particularly to FIGS. 14-17 for describing an embodiment of the invention.

FIG. 14 illustrates an example of flowchart of a method for storing software program instructions in memory (Flash memory for example) MF of the module (here the microcontroller) MD.

In step STP1, the reader RD enables communication with the tag TG by emitting the RF field as specified by the NFC/RFID standard in use.

The tag is powered by the reader field.

In step STP2, the reader sends specific RF commands to the tag to modify the level of the pins or terminals GPO1-GPO3, and thus GPC1-GPC3, in order to configure the microcontroller in the bootloader mode.

As a matter of fact, it is assumed here that the microcontroller MD needs pins GPCO1-GPCO3 to be set in a specific level to enter bootloader mode.

In step STP3, the reader sends specific RF commands to the tag to activate the energy harvesting circuit EHM and thus power the microcontroller.

The microcontroller then boots in bootloader mode.

In step STP4, the reader sends specific RF commands to the tag to send I2C commands to the microcontroller.

This step STP4 permits to download the firmware into the microcontroller flash memory MF.

Once programming is done, the reader ends in step STP5 the communication with the tag. The RF field is removed and the microcontroller is not powered anymore.

In step STP6, the microcontroller is ready to boot on the new firmware at next power up.

Step STP2 is more detailed with reference to FIG. 15.

More precisely, the reader RD sends a dedicated RF command 1500 to the tag TG to order for the control circuit GPOCTR to change the output level of the terminals GPO1-GPO3.

For example, in ISO15693 specification, it is allowed to used special command code (so called custom commands) CMCD followed by an IC manufacturer code ICMC, to create special RF commands that are not defined by the specification.

Thus the dedicated custom command 1500 can be used to modify the level of the terminals GPO1-GPO3 of the tag TG. The payload of the command, located between the start of frame SOF and the end of frame EOF, contains the number GPO_id of the terminals and the corresponding requested output level LGPO.

After having been processed by conventional means of the tag, for example a global state machine, which unwraps the command from the received RF frame, this command is managed by the control circuit GPOCTR and, depending on payload value, the control circuit GPOCTR modify the voltage level of the selected terminal GPOi.

The tag sends thus a RF response 1501 to the reader.

As mentioned above, the NFC/RFID tag then provides power supply to the microcontroller through the energy harvesting output EHMS. The dedicated command EHMCTRL which activates the energy harvesting circuit EHM is also unwrapped from a received RF frame by the global conventional state machine.

The microcontroller then boots in bootloader mode, since dedicated bootloader terminals GPCO1-GPCO3 of the microcontroller are already set in the correct voltage values by the terminals GPO1-GPO3 of the tag TG.

Once in bootloader mode, the microcontroller is watching the serial interface INTD to detect programming commands.

When I2C slave address of the microcontroller MD is detected, the bootloader BLD will execute known received I2C commands, which are specific to each microcontroller and which are transmitted using the I2C protocol framing.

This will permit to transmit the firmware instructions from the reader RD to the microcontroller MD (Step STP4) as it will be explained more in details now.

Generally speaking, RF commands embed I2C commands in their payload

The RF commands are decoded and executed by the tag as described above with reference to FIGS. 7-11.

The tag acts physically as the I2C master (the reader is the master on the system point of view) and the microcontroller MD, in bootloader mode, acts as the I2C slave.

The tag sends I2C commands received through RF interface to the microcontroller.

Those commands contain in particular the firmware instructions.

As mentioned above, I2C slave address and memory addresses to interact with bootloader are specific to each microcontroller.

For example on a microcontroller of the STMicroelectronics company having the reference STM32, I2C bootloader commands are composed of a start condition, the slave address sent by the master (the tag), an acknowledge (ack) condition from the slave (the microcontroller), then a specific command code (1 or 2 bytes) sent by the master, an ack condition by the slave followed by bytes sent or received in both possible directions depending of the command, ended by a stop condition.

FIGS. 16 and 17 illustrate an example of a complete sequence to send a bootloader command from the reader to the microcontroller's bootloader.

As illustrated in FIG. 16, the reader RD sends an RF write command 1600 to the tag.

This RF command 1600 is a write command analogous to the write command illustrated in FIG. 8

The RF command payload embeds a first bootloader command including all bytes of the I2C command destinated to the microcontroller bootloader.

In particular the payload embeds the I2C slave address of the microcontroller MD and the I2C byte 1 is the specific bootloader command code BLDCCD.

The other bytes are instructions of the firmware to store in the flash memory MF of the microcontroller MD.

Of course several write commands may be necessary to download the whole firmware.

The processing of this RF command 1600 is analogous to the one described for the write command 800 of FIG. 8.

As illustrated on FIG. 17, the tag TG then sends the I2C command received from NFC/RFID reader to the microcontroller on the I2C bus (here, an I2C write frame).

The processing of this I2C write command is analogous to the one described for the write command of FIG. 9.

In particular, the I2C pass-through state machine SM2 reads I2C bytes from buffer BF and sends them over the I2C bus to the corresponding slave module, adding signaling conditions (Start and Stop conditions). This forms a second bootloader command, consistent with the I2C protocol. The state machine SM2 has thus transformed the first bootloader command embedded in the RF command 1600 into said second bootloader command consistent with the I2C protocol.

The I2C pass-through state machine SM2 reads the Acknowledge bits Ack from I2C bus sent by the I2C slave module and stores value 0 in the "Ack" register bit RGK.

The reader then polls the tag through RF commands, to check the status of the I2C command execution.

This polling is made as explained with reference to FIG. 10.

In particular, the reader RD sends a RF read command to the tag to check if I2C operation is terminated (polling).

Upon receipt of this RF read command, the RF state machine SM1 reads the "I2C command in buffer" bit contained in the register RGC.

The value of this bit is sent to the reader RD via a RF response 1601 (FIG. 16) having a conventional structure compliant with the used RF protocol.

If the value of this bit is 0, the I2C write operation is over.

Then, as explained with reference to FIG. 11, the reader RD sends a RF read command to the tag to read the Acknowledge bit value contained in the register RGK to check if I2C write operation was successful. The write operation (i.e. the download of the firmware instructions) is successful if the Acknowledge bit value is 0.

The example of the RF pass through state machine SM1 and the example of I2C pass through state machine SM2 illustrated in FIGS. 12 and 13, both permit to implement in particular the steps of the method disclosed in FIGS. 14-17, notably the processing of the first and second bootloader commands.

When programming of microcontroller flash memory is completed, the NFC/RFID reader can control the level of the terminals GPCO1-GPCO3 of the microcontroller to disable bootloader, so that next boot of the microcontroller will be on Flash memory MF only.

The invention is not limited to the above examples, but can be extended to other RFID technologies: UHF (ISO18000-6, ISO18000-63, EPC Gen2).

Further the invention can be extended to other bus protocols.

An example of another possible protocol is SPI (Serial Peripheral Interface) (half duplex transmission or full duplex transmission) as explained more in details in the above mentioned PCT application.

In particular an example of a tag TG1, compatible with the use of the SPI protocol, is disclosed in FIG. 18.

This dual interface transponder (or tag) TG1 integrates: a contactless interface INT10, a SPI master interface INT20, a first volatile memory including a transmission (Tx) buffer (FIFO) BFT to store SPI bytes to be transmitted, and a reception (Rx) buffer (FIFO) BFR to store received SPI bytes; a second volatile memory including a plurality of registers. For example, the plurality of registers may include a register RGCF to store SPI configuration (clock phase/polarity, clock speed, bits order, full/half duplex transmission mode); a register (counter) DCNT to store the total number of SPI bytes to transmit and receive; a register (counter) TXCNT to store the number of bytes to transmit in half duplex transmission mode; a shift register SR to store transmit and received data in full-duplex; a register RGRT to store a bit to signal the SPI is ready to transmit (Tx buffer has been filled); a register RGTC to store a bit to signal the SPI transmit/receive is completed (Tx buffer BIT has been emptied, Rx buffer BFR has been filled). The TG1 integrates a first state machine SM10 for contactless (RF) pass through control; and a second state machine SM20 for SPI pass through control.

The SPI protocol is well known by the man skilled in the art.

Some features of the SPI protocol are reminded thereafter in relation with FIGS. 19-21.

As illustrated in FIG. 19, the master is connected to one or more slaves through 4 (in a full-duplex transmission mode) or more lines:
SCLK: clock
MOSI: Master Output Slave Input to transmit data to a slave
MISO: Master Input Slave Output to receive data from a slave
SS: Slave Select line, (active low to select the slave).

In half-duplex transmission mode (so called 3 wire mode), data is transmitted and received on the same line (MOSI=MISO).

As mentioned above, SPI can be set up to operate with a single master and a single slave, and it can be set up with multiple slaves controlled by a single master. There are two ways to connect multiple slaves to the master. If the master has multiple slave select pins, the slaves can be wired in parallel. If only one slave select pin is available, the slaves can be daisy-chained.

The clock signal SCLK synchronizes the output of data bits from the master to the sampling of bits by the slave. One bit of data is transferred in each clock cycle, so the speed of data transfer is determined by the frequency of the clock signal. SPI communication is always initiated by the master since the master configures and generates the clock signal.

The master can choose which slave it wants to talk to by setting the slave's SS line to a low voltage level. In the idle, non-transmitting state, the slave select line is kept at a high voltage level.

The master sends data to the slave bit by bit, in serial through the MOSI line. The slave receives the data sent from the master at the MOSI pin. Data sent from the master to the slave is usually, but not compulsorily, sent with the most significant (MSB) bit first.

The slave can also send data back to the master through the MISO line in serial. The data sent from the slave back to the master is usually sent with the least significant (LSB) bit first.

Data is only valid during SS low.

As illustrated on FIG. 20, the SPI bus is full duplex based on exchange of data in a shift register.

Bits from the master shift register are pushed into the slave shift register.

Bits from the slave shift register are pushed in the master shift register at the same time.

As illustrated in FIG. 21, data is sampled on SCLK, with configurable phase CPHA and polarity CPOL.

More precisely, the clock signal SCLK in SPI can be modified using the properties of clock polarity and clock phase. These two properties work together to define when the bits are output and when they are sampled. Clock polarity can be set by the master to allow for bits to be output and sampled on either the rising or falling edge of the clock cycle. Clock phase can be set for output and sampling to occur on either the first edge or second edge of the clock cycle, regardless of whether it is rising or falling.

The steps for SPI data transmission are the following ones:

The master outputs the clock signal; The master switches the SS pin to a low voltage state, which activates the slave; The master sends the data one bit at a time to the slave along the MOSI line. The slave reads the bits as they are received; If a response is needed, the slave returns data one bit at a time to the master along the MISO line. The master reads the bits as they are received.

The registers RGCF, RGRT, RGTC, DCNT, TXCNT contain control (called also configuration) data (one or several bits) which permit for example to determine the SPI configuration, or to indicate a status "ready to transmit" or the status of the operation (terminated for example) or numbers of bytes to transmit.

Those control registers are read and/or written by the RF state machine SM10 upon reception of a RF command (request) sent by the reader, or by the SPI state machine SM20.

More precisely, registers RGCF, RGRT, DCNT, TXCNT and RGTC are written by the RF state machine SM10.

For example if the register RGRT contains value 0, it means that there is no SPI command to be executed by the SPI state machine SM20.

If the register RGRT contains value 1, it means that there is a SPI command to be executed by the SPI state machine SM20.

The number of bytes to transmit on the SPI bus is determined by the contents of registers DCNT and eventually TXCNT.

In this respect the registers DCNT and TXCNT are also read by the state machine SM20.

The register RGRT is also read by the state machine SM20 to know if a command is to be executed on the bus and also written by the state machine SM20 when the execution of the command is terminated.

The register RGTC is written by the SPI state machine SM20 when the execution of the command is terminated and is read by the state machine SM10 upon request of the reader to know if the execution of a requested command is terminated.

This register RGTC is also reset by the state machine SM10.

Among those control data, the data contained in registers RGCF, DCNT and TXCNT are first control data sent within or deduced from data payloads of commands sent by the reader.

FIG. 22 details an example of the RF pass through state machine SM10 and FIG. 23 details an example of SPI pass through state machine SM20, both permitting to implement in particular the steps of the method for storing the firmware instructions using a SPI protocol, notably the processing of the first and second bootloader commands.

What is claimed is:

1. A system comprising:
a contactless reader; and
an apparatus including
a contactless transponder including a contactless interface and a transponder wired interface and being configured to communicate with the contactless reader according to a contactless protocol through the contactless interface,
a bus coupled to the transponder wired interface, and
at least one module coupled to the bus, the at least one module including a processing circuit, memory, a bootloader, and a controller, the contactless reader configured to communicate instructions of a software program executable by the processing circuit to the at least one module through the contactless transponder, the bootloader configured to store instructions into the memory in a bootloader mode, a terminal of the module dedicated to an activation of the bootloader mode and coupled to a terminal of the contactless transponder, the controller configured to set the terminal of the contactless transponder to a voltage level in response to a bootloader activation command being received from the contactless reader through the contactless interface.

2. The system according to claim 1, wherein the contactless reader and the contactless transponder are configured so that the contactless reader is the master on the bus during the communication of the instructions.

3. The system according to claim 1, wherein the contactless reader is further configured to activate the bootloader mode through the contactless transponder.

4. The system according to claim 3, wherein the contactless transponder comprises pass-through circuit configured to implement a pass-through function for message exchange between the contactless reader and the at least one module during communication of the instructions of the software program.

5. The system according to claim 4, wherein the contactless reader is configured to initiate at least one first bootloader command within at least one frame consistent with the contactless protocol, the at least one first bootloader command containing first data payload including the instructions of the software program, and the pass-through circuit is configured to transform the at least one first bootloader command into at least one second bootloader command on the bus consistent with a protocol used on the bus.

6. The system according to claim 5, wherein the pass-through circuit further comprises second volatile memory configured to store control data, the pass-through circuit being configured to implement the pass-through function for message exchange between the reader and the at least one module, on the basis of the control data.

7. The system according to claim 6, wherein the pass-through circuit comprises first volatile memory configured to buffer the first data payload and second data payload of responses intended to be sent to the reader through the contactless interface.

8. The system according to claim 7, wherein the pass-through circuit further comprises
a first state machine configured to cooperate with the reader through the contactless interface and configured to write/read the first volatile memory and a part of the second volatile memory based on commands received from the reader; and
a second state machine configured to cooperate with the bus through the wired interface based on a content of a part of the second volatile memory and configured to write/read the first volatile memory and a part of the second volatile memory.

9. The system according to claim 8, wherein the second state machine is configured to read the first data payload from the first volatile memory and to execute them on the bus, to manage a clock and all bus protocol signaling information.

10. The system according to claim 9, wherein the second state machine is configured to read answers on the bus and to store them in the first volatile memory for them to be read by the first state machine.

11. The system according to claim 5, wherein the bus is an I2C bus, and wherein the at least one first bootloader command initiated by the reader comprises at least one request of a write operation into the at least one module.

12. The system according to claim 11, wherein the at least one request of a write operation into the at least one module comprises an address of the at least one module, a specific command code and at least some of the instructions to be written in the memory.

13. The system according to claim 5, wherein the bus is a SPI bus, and wherein the at least one first bootloader command initiated by the reader comprises at least one write command.

14. The system according to claim 1, wherein the bus is an I2C bus.

15. The system according to claim 1, wherein the bus is a SPI bus.

16. The system according to claim 1, wherein the transponder comprises controllable energy harvesting circuit configured to power the at least one module, and the reader is configured to send a specific command to the transponder in order to activate the energy harvesting circuit.

17. An apparatus including:
a contactless transponder including a contactless interface and a transponder wired interface and being configured to communicate with a contactless reader according to a contactless protocol through the contactless interface;
a bus coupled to the transponder wired interface; and
at least one module coupled to the bus, the at least one module including a processing circuit, memory, a bootloader, and a controller, the at least one module configured to receive instructions of a software program executable by the processing circuit through the contactless transponder, the bootloader configured to store instructions into the memory in a bootloader mode, a terminal of the module dedicated to an activation of the bootloader mode and coupled to a terminal of the contactless transponder, the controller configured to set the terminal of the contactless transponder to a voltage level in response to a bootloader activation command being received from the contactless reader through the contactless interface.

18. The apparatus according to claim 17, wherein the at least one module comprises memory, a bootloader, and a bootloader mode in which the bootloader is configured to store the instructions into the memory.

19. The apparatus according to claim 18, wherein the contactless reader is further configured to activate the bootloader mode through the contactless transponder.

20. A method for storing software program instructions in memory of at least one module having a processing circuit, the method comprising:
providing a transponder including a contactless interface and a transponder wired interface;
coupling a bus between the transponder wired interface and the at least one module;
having a reader communicate the software program instructions to the transponder through the contactless interface according to a contactless protocol;
having the transponder communicate the software program instructions on the bus to the at least one module;
having the reader initiate at least one first bootloader command within at least one frame consistent with the contactless protocol, the at least one first bootloader command containing first data payload including the instructions of the software program; and
having a pass-through function transform the at least one first bootloader command into at least one second bootloader command on the bus consistent with a protocol used on the bus, the pass-through function used to exchange messages between the reader and the at least one module.

21. The method according to claim 20, further comprising having the reader act as the master on the bus during the communication of the software program instructions.

22. The method according to claim 20, further comprising:
providing the at least one module with memory and a bootloader;
placing the at least one module in a bootloader mode; and
having the bootloader store the software program instructions into the memory.

23. The method according to claim 22, further comprising having the reader activate the bootloader mode through the transponder.

24. The method according to claim 23, further comprising:
providing the at least one module with at least one module terminal dedicated to the activation of the bootloader mode;
providing the transponder with at least one transponder terminal coupled to the at least one module terminal;
having the reader send a bootloader mode activation command to the transponder through the contactless interface; and
having the transponder set the at least one transponder terminal at a voltage level in response to the bootloader mode activation command.

25. The method according to claim 20, further comprising, by the transponder:
storing control data; and
implementing the pass-through function on the basis of the control data, during communication of the instructions of the software program.

26. The method according to claim 25, further comprising:
providing the at least one module with memory and a bootloader;
placing the at least one module in a bootloader mode; and
having the bootloader store the software program instructions into the memory.

27. The method according to claim 20, wherein the bus is an I2C bus or an SPI bus.

28. The method according to claim 20, further providing the transponder with controllable energy harvesting circuit configured to power the at least one module, and having the reader send a specific command to the transponder in order to activate the energy harvesting circuit.

29. The apparatus according to claim 17, wherein the contactless transponder comprises a pass-through circuit configured to implement a pass-through function for message exchange between the contactless reader and the at least one module during communication of the instructions of the software program.

30. The apparatus according to claim 29, wherein the contactless reader initiates at least one first bootloader command within at least one frame consistent with the contactless protocol, the at least one first bootloader command containing first data payload including the instructions of the software program, and the pass-through circuit is configured to transform the at least one first bootloader command into at least one second bootloader command on the bus consistent with a protocol used on the bus.

* * * * *